US009709659B2

(12) United States Patent
Tyomkin et al.

(10) Patent No.: US 9,709,659 B2
(45) Date of Patent: Jul. 18, 2017

(54) OBJECT TRACKING

(75) Inventors: Alexander Tyomkin, Tel-Aviv (IL);
Itzhak S. Ornstein, Ramat-Ha'sharon
(IL); Zvi Greidinger, Petah-Tiqva (IL);
Yacov Yeshurun, Nof-Ayalon (IL);
Yoel Shumacher, Netanya (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 45 days.

(21) Appl. No.: 13/246,084

(22) Filed: Sep. 27, 2011

(65) Prior Publication Data
US 2012/0314900 A1 Dec. 13, 2012

(30) Foreign Application Priority Data
Jun. 13, 2011 (IL) .......................................... 213506

(51) Int. Cl.
*G06K 9/00* (2006.01)
*G01S 3/786* (2006.01)
*G06T 7/246* (2017.01)

(52) U.S. Cl.
CPC ............ *G01S 3/7865* (2013.01); *G06T 7/248* (2017.01); *G06T 2207/10016* (2013.01); *G06T 2207/20092* (2013.01); *G06T 2207/20104* (2013.01); *G06T 2207/30212* (2013.01); *G06T 2207/30232* (2013.01)

(58) Field of Classification Search
USPC ........................................ 382/103, 195, 218
See application file for complete search history.

(56) References Cited

U.S. PATENT DOCUMENTS

| 6,037,936 A * | 3/2000 | Ellenby et al. ............... 715/764 |
| 7,184,574 B1 | 2/2007 | Zahavi |
| 7,620,218 B2 | 11/2009 | Steinberg et al. |
| 2002/0037770 A1 * | 3/2002 | Paul et al. ...................... 463/36 |
| 2002/0140814 A1 | 10/2002 | Cohen-Solal et al. |
| 2005/0077469 A1 * | 4/2005 | Kaushal ........................ 250/330 |
| 2008/0267451 A1 | 10/2008 | Karazi |
| 2009/0129631 A1 * | 5/2009 | Faure et al. .................. 382/103 |

FOREIGN PATENT DOCUMENTS

| EP | 2 117 225 A1 | 11/2009 |
| WO | WO 00/46985 A1 | 8/2000 |
| WO | WO 2006/137071 A2 | 12/2006 |

OTHER PUBLICATIONS

Israeli Patent Application No. 134206 filed on Jan. 24, 2000.
Israeli Patent Application No. 169345 filed on Jun. 23, 2005.
Israeli Patent Application No. 169346 filed on Jun. 23, 2005.
Israeli Patent Application No, 169347 filed on Jun. 23, 2005.
Katja Nummiaro et al., An adaptive color-based particle filter, *Image and Vision Computing*, 2003, vol. 21, pp. 99-110.
"Histogram," Wikipedia, http://en.wikipedia.org/wiki/Histogram, Accessed on Feb. 20, 2013.
Pérez, Patrick, et al. "Color-based probabilistic tracking." Computer vision—ECCV 2002. Springer Berlin Heidelberg, 2002. 661-675.
http://en.wikipedia.org/wiki/Template_matching (Aug. 22, 2013).

* cited by examiner

*Primary Examiner* — Weiwen Yang
(74) *Attorney, Agent, or Firm* — Oliff PLC

(57) ABSTRACT

The disclosure describes examples of systems, methods, program storage devices, and computer program products for tracking an object, where a reference image of the tracked object is outputted to an operator.

40 Claims, 5 Drawing Sheets

OBJECT TRACKING

TECHNICAL FIELD

The disclosure relates to tracking an object.

BACKGROUND

In many applications, an image source acquires images which are displayed to an operator. Examples of applications include traffic control, border control, search and rescue operations, land surveys, police surveillance, military applications, etc.

An operator may initiate tracking of an object displayed in a real time image by specifying the object to be tracked. For instance, the operator may overlay crosshairs or another symbol approximately on the center of the object, or the operator may enclose as much as possible of the object in a predetermined shape such as a rectangle. An indication of the object to be tracked may then be transferred to a tracker. Alternatively, tracking may be automatically initiated without operator involvement, for instance upon discerning of an object to be tracked in a real time image.

Once tracking has been initiated, the tracker may control the tracking by instructing the image source so that preferably the image source acquires real time images which include the tracked object. The real time images which preferably include the tracked object may be displayed to the operator. In some cases, a symbol such as crosshairs, indicating the center of the tracked object as estimated by the tracker, may be displayed overlaid on the images.

SUMMARY

In one aspect, the disclosed subject matter provides a system for object tracking, comprising: a tracker operable to provide a reference image of an object being tracked for output to an operator, to receive a real time image, to seek the tracked object in the real time image based at least partly on the reference image, and to issue an instruction based on a result of the seeking for acquiring a subsequent real time image.

In some examples of the system, the tracker is further operable to determine the reference image. In some cases of these examples, the tracker is further operable to receive an input provided by an operator, and to consider at least the input when performing at least one of: determining the reference image, or seeking the tracked object in the real time image.

In some examples of the system, the tracker is further operable to perform at least one of the following: start object tracking or end object tracking.

In some examples, the system further comprises: an output interface operable to output the reference image to the operator.

In another aspect, the disclosed subject matter provides a system for object tracking, comprising: an output interface operable to output a reference image of an object being tracked to an operator.

In some examples the system further comprises: an input interface, operable to receive an input from the operator, and operable to provide the input to a tracker for use in tracking the object. In some cases of these examples, the input includes at least one selected from a group comprising: start tracking indication, end tracking indication, one or more dimensions of the object being tracked, location information relating to object being tracked, color information relating to object being tracked, specification that center of reference image should be changed to a different point, specification of center of object, specification that tracking following zoom in/zoom out appears successful/unsuccessful, specification that object being tracked should be changed, specification that smaller/larger object should be tracked, specification that the tracked object does not appear to be centered in the real time image, specification that reference image should be updated, specification of desired polarity, or specification that reference image should be updated more frequently or less frequently.

In some examples of the system, the reference image is outputted as a picture within a larger picture of a real time image of the tracked object.

In another aspect, the disclosed subject matter provides a system for object tracking, comprising: an image source operable to receive an instruction which was issued by a tracker based on a result of the tracker seeking an object being tracked within a real time image, wherein the seeking considered at least an input of an operator with access to an outputted reference image, the image source further operable to acquire a subsequent real time image at least partly based on the received instruction.

In some examples of the system, the image source changes or does not change direction of pointing when acquiring the subsequent image, at least partly based on the received instruction.

In another aspect, the disclosed subject matter provides a system for object tracking, comprising: an input interface operable to receive an input from an operator with access to an outputted reference image, and operable to provide the input to a tracker for use in tracking the object.

In some examples of the system, the input includes at least one selected from a group comprising: start tracking indication, end tracking indication, one or more dimensions of the object being tracked, location information relating to object being tracked, color information relating to object being tracked, specification that center of reference image should be changed to a different point, specification of center of object, specification that tracking following zoom in/zoom out appears successful/unsuccessful, specification that object being tracked should be changed, specification that smaller/larger object should be tracked, specification that the tracked object does not appear to be centered in the real time image, specification that reference image should be updated, specification of desired polarity, or specification that reference image should be updated more frequently or less frequently.

In another aspect, the disclosed subject matter provides a tracking method, comprising: providing a reference image of an object being tracked for output to an operator; receiving a real time image; seeking the tracked object in the real time image, at least partly based on the reference image; and issuing an instruction based on a result of the seeking for acquiring a subsequent real time image.

In some examples, the method further comprises: determining the reference image. In some of these examples, the method further comprises: receiving input provided by an operator; and considering at least the input when performing at least one of determining the reference image, or seeking the tracked object in the real time image.

In some examples, the method further comprises: outputting the reference image to the operator.

In another aspect, the disclosed subject matter provides a method of interfacing with an operator regarding object tracking, comprising: outputting a reference image of an object being tracked to an operator.

In some examples, the method further comprises: receiving an input from the operator; and providing the input to a tracker for use in tracking the object.

In some examples of the method, the reference image is outputted as a picture within a larger picture of a real time image of the tracked object.

In another aspect, the disclosed subject matter provides a method of acquiring a real time image for use in object tracking, comprising: receiving an instruction which was issued by a tracker based on a result of the tracker seeking an object being tracked within a real time image, wherein the seeking considered at least an input of an operator with access to an outputted reference image; and acquiring a subsequent real time image at least partly based on the received instruction.

In some examples of the method, the acquiring includes: changing or not changing direction of pointing, at least partly based on the received instruction.

In another aspect, the disclosed subject matter provides a method of interfacing with an operator regarding object tracking, comprising: receiving an input from an operator with access to an outputted reference image; and providing the input to a tracker for use in tracking the object.

In another aspect, the disclosed subject matter provides a program storage device readable by machine, tangibly embodying a program of instructions executable by the machine to perform a tracking method, comprising: providing a reference image of an object being tracked for output to an operator; receiving a real time image; seeking the tracked object in the real time image, at least partly based on the reference image; and issuing an instruction based on a result of the seeking for acquiring a subsequent real time image.

In another aspect, the disclosed subject matter provides a computer program product comprising a computer useable medium having computer readable program code embodied therein for tracking, the computer program product comprising: computer readable program code for causing the computer to provide a reference image of an object being tracked for output to an operator; computer readable program code for causing the computer to receive a real time image; computer readable program code for causing the computer to seek the tracked object in the real time image, at least partly based on the reference image; and computer readable program code for causing the computer to issue an instruction based on a result of the seeking for acquiring a subsequent real time image.

In another aspect, the disclosed subject matter provides a program storage device readable by machine, tangibly embodying a program of instructions executable by the machine to perform a method of interfacing with an operator regarding object tracking, comprising: outputting a reference image of an object being tracked to an operator.

In another aspect, the disclosed subject matter provides a computer program product comprising a computer useable medium having computer readable program code embodied therein for interfacing with an operator regarding object tracking, the computer program product comprising: computer readable program code for causing the computer to output a reference image of an object being tracked to an operator.

In another aspect, the disclosed subject matter provides a program storage device readable by machine, tangibly embodying a program of instructions executable by the machine to perform a method of acquiring a real time image for use in object tracking, comprising: receiving an instruction which was issued by a tracker based on a result of the tracker seeking an object being tracked within a real time image, wherein the seeking considered at least an input of an operator with access to an outputted reference image; and acquiring a subsequent real time image at least partly based on the received instruction.

In another aspect, the disclosed subject matter provides a computer program product comprising a computer useable medium having computer readable program code embodied therein for acquiring a real time image for use in object tracking, the computer program product comprising: computer readable program code for causing the computer to receive an instruction which was issued by a tracker based on a result of the tracker seeking an object being tracked within a real time image, wherein the seeking considered at least an input of an operator with access to an outputted reference image; and computer readable program code for causing the computer to acquire a subsequent real time image at least partly based on the received instruction.

In another aspect, the disclosed subject matter provides a program storage device readable by machine, tangibly embodying a program of instructions executable by the machine to perform a method of interfacing with an operator regarding object tracking, comprising: receiving an input from an operator with access to an outputted reference image; and providing the input to a tracker for use in tracking the object.

In another aspect the disclosed subject matter provides a computer program product comprising a computer useable medium having computer readable program code embodied therein for interfacing with an operator regarding object tracking, the computer program product comprising: computer readable program code for causing the computer to receive an input from an operator with access to an outputted reference image; and computer readable program code for causing the computer to provide the input to a tracker for use in tracking the object.

BRIEF DESCRIPTION OF THE DRAWINGS

In order to understand the subject matter and to see how it may be carried out in practice, examples will be described, with reference to the accompanying drawings, in which.

DETAILED DESCRIPTION OF THE DRAWINGS

Described herein are some examples of systems, methods, program storage devices, and computer program products for tracking an object, where a reference image of the tracked object is outputted to an operator.

In the following detailed description, numerous specific details are set forth in order to provide a thorough understanding of the subject matter. However, it will be understood by those skilled in the art that some examples of the subject matter may be practiced without these specific details. In other instances, well-known stages, methods, modules, and systems have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "providing", "perceiving", "receiving", "seeking", "attempting", "detecting", "issuing", "acquiring", "capturing", "determining", "considering", discerning, "deciding", "executing", "performing", "starting", "ending", "outputting", "taking", specifying", "indicating", "inputting", "changing", "keeping", "relying", "pointing", "tracking", "integrating", "arranging", or the like, refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Figure 1:
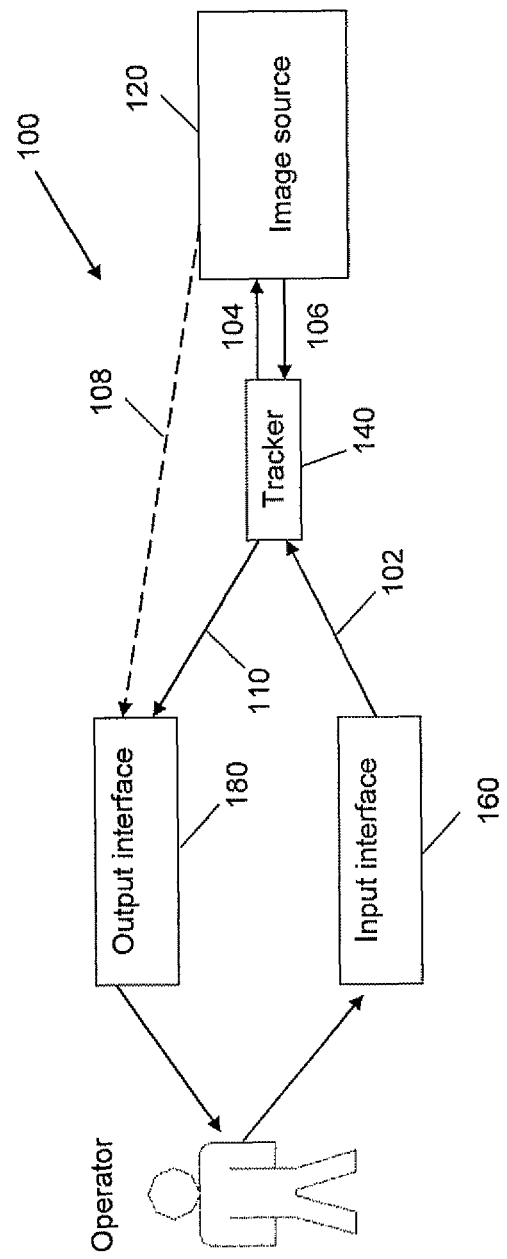
FIG. 1 is a block diagram illustrating an example of a system for object tracking, in accordance with the presently disclosed subject matter.

FIG. 1 is a block diagram illustrating an example of a system 100 for object tracking, in accordance with the presently disclosed subject matter.

In the illustrated example, object tracking system 100 includes: one or more tracker modules 140 configured to track an object; one or more image source modules 120 configured to acquire images which preferably include the tracked object; one or more input interface modules 160 configured to receive input from an operator regarding the tracking; and one or more output interface modules 180 configured to provide output to the operator regarding the tracking.

It should be understood that the term "object" as used herein with respect to tracking does not necessarily refer to a single standalone entity. Depending on the example, the object that is being tracked may include any appropriate one or more standalone entities or part(s) thereof. For example, the tracked object may include: part of a single standalone entity (e.g. a wing of an aircraft, wheel of a land-based vehicle, both wings of an aircraft, four wheels on a land-based vehicle, the hull of a watercraft, etc), a single standalone entity (e.g. an aircraft, a land-based vehicle, a watercraft, etc), parts of more than one standalone entity (e.g. wings of two aircrafts flying side by side, back of one land-based vehicle and front of next land-based vehicle, sails on two watercrafts, etc), a plurality of standalone entities (e.g. two aircrafts, three land-based vehicles, four watercrafts, etc), etc.

Depending on the instance, the various modules shown in FIG. 1 may be located in the same location, or may be located in different locations. For instance, in some cases, all of the modules may be located on/in a moving vehicle/craft (e.g. on land, in the air, or in/on water). In another instance, image source module(s) 120 and all or part of tracker module(s) 140 may be located on/in a moving vehicle/craft; but input interface module(s) 160, output interface module(s) 180 and all or part of tracker module(s) 140 may be stationary.

In various instances, transferring between the various modules in FIG. 1 may be via any suitable channel(s) which provides direct or indirect connectivity. Examples of possible channel(s) include: internal bus, external bus, cellular network, personal area network, local area network, wide area network, internetwork, Internet, any wired network, any wireless network, any combination of the above, etc. In order to facilitate reader understanding, a separate arrow is drawn in FIG. 1 to represent transferring between different modules and/or to represent transferring in a different direction. It should be understood however that the arrows do not necessarily reflect all possible implementations and therefore the illustration and the description of the arrows herein should not be construed so as to impose limitations on attribute(s) of possible channel(s) which may be used for direct or indirect transferring.

In the illustrated example, image source module(s) 120 is configured to acquire real time image(s) based on instruction(s) from tracker module(s) 140 (arrow 104). In some instances, image source module(s) 120 may include image sensor module(s) configured to acquire the real time images, and pointer control module(s) configured, based on the instructions from tracker module(s) 140, to control the direction in which image sensor module(s) points when acquiring the images. For example, pointer control module(s) may in some cases include one or more gimbals. If tracking has not ended, an instruction from tracker module(s) 140 may in some instances include at least the difference between the estimated or known center of the tracked object with respect to the center of the preceding real time image (e.g. gimbal error). In some of these instances, if the difference is not zero, then based on the difference, image source module(s) 120 may adjust the pointing direction in order to attempt to place the center of the tracked object in the center of the field of view of image source module(s) 120. Alternatively, in some instances, an instruction from tracker modules(s) 140 may not include such a difference, as will be explained further below.

In various instances, image source module(s) 120 (or in some of these instances, more specifically image sensor module(s)) may be configured to acquire real time images using any appropriate technology, for instance based on light of the visible spectrum and/or based on other portion(s) of the electromagnetic spectrum (e.g. Infra-red), etc. The rate of image acquisition is not limited by the disclosure. In one instance images may be acquired at a rate of 25 images per second but in other instances the rate may be higher or lower.

In some instances, image source module(s) 120 may be configured to provide real time images to tracker module(s) 140 (arrow 106). In other instances image source module(s) 120 may be configured to provide real time images to tracker module(s) 140 (arrow 106) and to provide real time images to output interface module(s) 180 (optional arrow 108). In some cases, image source module(s) 120 may be configured to provide other information besides real time images (e.g. zoom value, change in zoom value, etc.) to tracker module(s) 140 and/or to output interface module(s) 180 (arrow 106 and/or 108).

In the illustrated example, tracker module(s) 140 is configured to track an object. Depending on the instance, tracker module(s) 140 may be configured to perform one or more of the following in order to track an object: seeking the tracked object within real time image(s), determining reference image(s), issuing instruction(s) regarding the image acquisition to image source module(s) 120, starting tracking, ending tracking, changing tracking mode, etc.

Depending on the instance, the seeking of the tracked object within a real time image may be at least partly based on (i.e. take into account, consider, rely on) a reference image of the tracked object and/or on input(s) received from input interface module(s) 160 (arrow 102).

In some instances, tracker module(s) 140 may be configured to seek the tracked object within a real time image by performing at least the following: attempting to detect a reference image of the object that is being tracked within a real time image received from image source module(s) 120. Correlation is an example of a machine-based technique for attempting to detect the reference image within the real time image, where a reference image of the tracked object is correlated with a real time image. Continuing with the example, the correlation may in some cases be pixel based and two dimensional as is known in the art. In other examples, tracker module(s) 140 may use, in addition to or instead of correlation, other machine-based technique(s) for detecting the reference image within the real time image, mutatis mutandis.

Additionally or alternatively, in some instances, tracker module(s) 140 may be configured to seek the tracked object within a real time image based at least partly on input(s) received from input interface module(s) 160. For example, if an input indicates a characteristic of the tracked object (e.g. location, measurement, color, etc), the input may assist tracker module(s) 140 when seeking the tracked object within the real time image. In some cases, one or more of the received input(s) are from an operator with access to an outputted reference image (as discussed further below).

The disclosure does not impose limitations on what seeking result(s) include. In various instances, seeking result(s) may include one or more of the following: numerical result(s), the estimated center of the tracked object in the real time image(s), conclusion(s) relating to tracking failure, etc.

For instance, the result(s) of seeking may in some cases include conclusion(s) that the tracking is likely to be failing (herein below "object loss") or has failed. In some of these cases, if the seeking indicates poor tracking quality (i.e. low tracking quality), but the poor tracking quality has not been persistent over a predetermined number of real time images, then tracker module(s) 140 may be configured to conclude that there has been an "object loss". However, if tracking quality has been low persistently for a predetermined number of real time images, then tracker module(s) 140 may be configured to conclude that tracking has failed. For example in cases where a reference image is correlated with a real time image, poor tracking quality may be consistent with low correlation number(s).

In some cases, the result(s) of seeking may reflect the result(s) of attempting to detect the reference image in the real time image (e.g. reflects correlation result(s)), whereas in other cases the result(s) of seeking may additionally or alternatively be affected by received input(s). For instance, in some cases where correlation of the reference image with the real time image is performed, tracker module(s) 140 may estimate the center of the tracked object in the real time image to be at the point in the real time image with the highest correlation number, whereas in other cases tracker module(s) 140 may rely on received input(s) in addition to or instead of the detection result(s) (e.g. correlation result(s)) when estimating the center.

In some instances, tracker module(s) 140 may be configured to use the result(s) of seeking the tracked object within the real time image (or in some of these instances, more specifically the result(s) of attempting to detect a reference image in a real time image) when making a decision on reference image updating, when determining whether or not to end tracking, when determining whether or not to change tracking mode, and/or when issuing instructions, etc.

In some instances, tracker module(s) 140 may be configured to determine a reference image of the object being tracked (which may be the initial reference image, an updated reference image, or a replacement reference image) based on real time image(s) and/or other information received from image source module(s) 120 (arrow 106) and/or based on input(s) received from input interface module(s) 160 (arrow 102). In some of these instances, tracker module(s) 140 may be operable to update the reference image when deemed necessary due to result(s) of attempting to detect the reference image within real time image(s) (e.g. correlation result(s)), other information received from image source module(s) 120 and/or input(s) received from input interface module(s) 160. Any appropriate reason may cause the reference image to not sufficiently accurately reflect the targeted object and/or to not be sufficiently similar to the real time image (e.g. a quick zoom in or zoom out event by image source module(s) 120, inclusion of interfering background elements in the reference image, etc). When deemed necessary, the reference image may be updated using any appropriate procedure. For example the updated reference image may in some cases be based on the averaging of the last n (n≥1) real time images. Additionally or alternatively, in some of these instances tracker module(s) 140 may be operable to replace the reference image under memory mode as will be described in more detail below. Additionally or alternatively, in some of these instances, tracker module(s) 140 may be operable to determine a new (initial) reference image which does not take into account historical reference images and/or historical real time images, each time tracking is started. See below description of stage 208 for some examples of determining an initial reference image.

In some instances, tracker module(s) 140 may be configured to issue instruction(s) regarding the real time image acquisition to image source module(s) 120 (arrow 104) based on seeking result(s). For example, if a seeking result indicates that the estimated center of the tracked object is or is not in the center of the real time image (e.g. the center of the reference image which is detected in the real time image is or is not in the center of the real time image, an input allows tracker module(s) 140 to determine that the tracked object is or is not centered, etc.), the instruction(s) may attempt to cause image source module(s) 120 to maintain or change the direction of pointing in order that the tracked object will be centered in the field of view and consequently in a subsequent real time image. In some cases of this example, the instruction may include an indication of the difference (zero or non-zero) between the estimated center of the tracked object and the center of the real time image (e.g. gimbal error), and therefore tracker module(s) 140 may be configured to determine this difference when issuing instruction(s) based on seeking result(s). In some cases of this example, the tracker module(s) 140 may estimate the center of the tracked object based on the point in the real time image where the center of the reference image is detected and/or based on input. For instance, assuming tracker module(s) 140 performs correlation and the reference image is centered in the center of the real time image, the highest correlation number should be in the center of the real time image.

In another example of instruction(s) based on seeking result(s), if a seeking result includes the conclusion(s) that tracking is likely to be failing ("object loss") and the tracking mode is memory mode, then in some cases, the instruction(s) may include indication(s) based on that seeking result which is/are appropriate to memory mode. In some of these cases, the instruction(s) may include a gimbal error of zero so that image source module(s) 120 maintains the direction of pointing and/or other indication(s) to retain status quo parameters (e.g. speed).

Additionally or alternatively, in some instances when tracking has ended, tracker module(s) 140 may be configured to cease issuing instruction(s) or may be configured to issue arbitrary instruction(s) (arrow 104). In some of these cases the issuing of instruction(s) even though arbitrary, rather than ceasing the issuing of instructions, may better maintain the stability of image source module(s) 120.

Additionally or alternatively, in some instances, at the start(s) of tracking tracker module(s) 140 may be configured to issue instruction(s) regarding the image acquisition to image source module(s) 120 (arrow 104) based on input(s) received from input interface module(s) 160 (arrow 102) or based on the automatic discerning of the object to be tracked. In some of these instances the instruction(s) may attempt to cause image source module(s) 120 to center (or maintain the center of) the tracked object in the field of view and consequently in a subsequent real time image. In some cases of these instances, an instruction may include an indication of the difference (zero or non-zero) between the center of the object which was indicated for tracking by the operator (via input interface module(s) 160) or automatically discerned, and the center of the real time image (e.g. gimbal error), and therefore tracker module(s) 140 may be configured to determine this difference when issuing instruction(s) at the start of tracking. Depending on the instance, at the start of tracking, the center of the object in the real time image may be approximately indicated by the operator and hence "known" to tracker module(s) 140 (notwithstanding that the "known" center may not actually be the center), or the center may be estimated by tracker module(s) 140. Therefore in the description herein when referring to the center of the object at the start of tracking, it should be understood that the term "center" may refer to a known or estimated center.

In some instances, tracker module(s) 140 may be configured to start or end tracking. Depending on the instance, the decision by tracker module(s) 140 to start/end tracking may not be based, may be partly based, or may be completely based on input(s) received from input interface module(s) 160 (arrow 102). For instance, tracker module(s) 140 may receive an indication of the object to be tracked from input interface module(s) 160 which in this instance is assumed to also function as an indication to start tracking.

In another instance, tracker module(s) 140 may start tracking after automatic discerning of an object to be tracked in a real time image. In some cases of this instance, tracker module(s) 140 may be configured to start tracking upon automatic discerning of certain type(s) of object, e.g. a missile. In another instance, additionally or alternatively tracker module(s) may receive a straightforward end command (e.g. end tracking for any reason) from input interface module(s) 160. Additionally or alternatively, depending on the instance, the decision to start/end may not be based, may be partly based, or may be completely based on seeking results. For instance, tracker module(s) 140 may end tracking when seeking results include the conclusion that tracking has failed.

In some cases when ending a tracking, tracker module(s) 140 may be configured to stop seeking the tracked object in the real time image and/or to stop updating the reference image.

In some cases, in order to add to the stability of image source module(s) 120 when ending a tracking, tracker module(s) 140 may be configured to issue arbitrary instruction(s) until the next tracking (arrow 104). In other cases, when ending a tracking, tracker module(s) 140 may be configured to cease issuing instruction(s).

In some instances, tracker module(s) 140 may be configured to change the tracking mode. In some cases of these instances, if the tracking is likely to be failing ("object loss"), tracker module(s) 140 may change, or maintain, the tracking mode to memory mode, replacing the current reference image, for example with a reference image based on the last real time image. In some of these cases memory mode may continue until tracking quality sufficiently improves or tracking has failed. In other instances, tracker module(s) 140 is not so configured, and there is no memory mode even when tracking is likely to be failing.

Based on the above, in various instances, tracker module(s) 140 may or may not receive input(s) from input interface module(s) 160. In instances where tracker module(s) 140 receives input(s) from input interface module(s) 160, then in some of these instances tracker module(s) 140 may be configured to determine whether to use or discard/ignore received input(s) whereas in other instances tracker module(s) 140 may not be configured to ignore/discard received input(s) and may be configured to use any received input(s). In cases where tracker module(s) 140 uses received input(s), then in various instances of these cases the input(s) may be used in various ways for object tracking by tracker module(s) 140. Depending on the instance, the input(s) may be used in determining a reference image, in seeking the tracked object in the real time image, in starting tracking, in ending tracking, and/or in changing tracking mode, etc. Depending on the instance, the targeted usage(s) of a particular input may be specified or tracking module(s) 140 may determine how the input should be used.

In some instances, tracker module(s) 140 may be configured to integrate the reference image with the real time image (e.g. picture in a picture) and provide the integrated image to output interface module(s) 180 (arrow 110). Picture in a picture is well known in the art. In other instances, tracker module(s) 140 may be configured to provide to output interface module(s) 180 (arrow HO) only reference images, or may be configured to provide to output interface module(s) 180 (arrow 110) separated reference images and real time images. If real time images are provided within integrated images or separately by tracker module(s) 140, then, depending on the instance, the provided real time images may be identical to those received from image source module(s) 120 or may have been processed by tracker module(s) 140 (and in the latter instance tracker module(s) may be configured to perform such processing). Besides images, in some cases tracker module(s) 140 may be configured to provide other information to output interface module(s) 180 (arrow HO), such as one or more of the following: indication(s) of seeking result(s) (e.g. the estimated center of the tracked object on a real time image, correlation numbers(s), a correlation matrix, object loss etc.), end indication(s), start indication(s), information (e.g. zoom value, change in zoom value, etc) received from image source module(s) 120, other comments and/or support information, etc. In some of these cases, tracker module(s) 140 may be configured to integrate some or all of this other information with the real time image and/or reference image and provide the integrated image to output interface module(s) 180 (arrow 110), Additionally or alternatively in other of these cases, tracker module(s) 140 may be configured to provide some or all of this information to output interface module(s) 180 (arrow 110) separately from images.

In some instances after ending a tracking, tracker module(s) 140 may be configured to continue to provide the same (most recent) reference image to output interface module(s) 180 but in other instances tracker module(s) 140 may be configured to cease the provision of a reference image. Additionally or alternatively, assuming instances where tracker module(s) 140 is configured to provide real time images (separately or integrated), in some of these instances tracker module(s) 140 may be configured after ending a tracking to continue to provide real time images to output interface module(s) 180 e.g. so that an operator can use the real time images to start a new tracking.

In the illustrated example, output interface module(s) 180 is configured to provide output to the operator regarding the tracking, including reference image(s), via any appropriate output interface module(s) such as display (e.g. touch screen, non-touch screen, etc.) and/or speaker, etc. In some instances, real time images may also be outputted to the operator via the same or different output interface module(s). For instance, in some cases, output interface module(s) may be configured to receive reference images (e.g. from tracker module(s)-arrow 110) and real time images (e.g. from tracker module(s)-arrow 110 and/or from image source module(s)-arrow 108) separately, may be configured to integrate the reference image with the real time image, e.g. as a picture within a picture (and possibly perform other processing), and may be configured to output the integrated image, on the same output interface module(s). In other cases, for instance, output interface module(s) 180 may be configured to receive reference images (e.g. from tracker module(s)-arrow 110) and real time images (e.g. from tracker module(s)-arrow 110 and/or from image source module(s)-arrow 108) separately, and to output the reference and real time images (as received or after processing) separately, on different output interface module(s). In other cases, for instance, output interface module(s) 180 may be configured to receive an already integrated reference image and real time image (e.g. from tracker module(s) 140-arrow 110), such as a picture in a picture, and to output the integrated image (as received or after processing) on the same output interface module(s). Assuming instances which use the same output interface module(s) for displaying an integrated image, in some of these instances the reference image and real time image may be arranged in the integrated image in an arrangement which facilitates analysis, overseeing, training, and/or inputting, etc. by an operator.

In some instances, in addition to images, output interface module(s) 180 may be configured to receive other information from tracker module(s) 140 (arrow 110) and/or from image source module(s) 120 (arrow 108) and to provide some or all of the received information to the operator. For example, received information may include one or more of the following: indication(s) of seeking result(s) (e.g. the estimated center of the tracked object in a real time image, correlation number(s), correlation matrix, object loss, etc.), end indication(s), start indication(s), information determined by image source module(s) 120 (e.g. zoom value, change in zoom value, etc), other comments and/or support information, etc. In various cases of these instances, some or all of the received information may be outputted on the same or different output interface module(s) as the reference images (and/or as the real time images, if outputted). For instance, in some cases, output interface module(s) may be configured to receive the other information separately from the images, may be configured to integrate some or all of the received information with a real time and/or reference image, e.g. as a picture within a picture (and possibly perform other processing), and may be configured to output the integrated image, on the same output interface module(s). In other cases, additionally or alternatively, output interface module(s) 180 may be configured to receive the other information separately from any images, and to output some or all of the received information separately from any images, on different output interface module(s). In other cases, additionally or alternatively, output interface module(s) 180 may be configured to receive the other information already integrated with a reference image and/or real time image such as a picture in a picture, and to output the integrated image (as received or after processing) on the same output interface module(s). Assuming instances which use the same output interface module(s) for displaying an integrated image which includes some or all of the received information, in some of these instances the displayed information and the real time and/or reference image may be arranged in the integrated image in an arrangement which facilitates analysis, overseeing, development, training, and/or inputting, etc. by an operator.

Depending on the instance, output interface module(s) 180 may or may not include processing capabilities relating to the reference images, real time images, and/or other received information. In instances where output interface module(s) 180 includes processing capabilities related to any of the above, any appropriate processing may take place, (e.g. integrating reference images with real time images, integrating other received information with real time and/or reference images, increasing/decreasing contrast, filtering, any other image related processing, any other processing, etc.)

In the illustrated example, input interface module(s) 160 is configured to receive input(s) from an operator regarding the tracking and to provide the input(s) to tracker module(s) 140 (arrow 102) for use in object tracking.

Assuming instances where input by the operator is allowed, then, depending on the instance, the types of input which input interface module(s) 160 may be configured to receive, may vary. In some instances, the only input(s) which input interface module(s) 160 may be configured to receive includes indication to start tracking (e.g. by overlaying a symbol or enclosing within a predetermined shape in order to specify object to be tracked, etc) and/or indication to end tracking. In various other instances input(s) received from the operator may include input(s) which could be used by tracker module(s) 140 in determining a reference image, in seeking the tracked object in a real time image, in starting tracking, in ending tracking, and/or in changing tracking mode etc. For instance, the input(s) may include any of the following: start tracking indication, end tracking indication, one or more dimensions of the object being tracked, location information relating to object being tracked, color information relating to object being tracked, specification that center of reference image should be changed to a different point (e.g. center of reference image should be moved to center of boat from side of boat), specification of center of object, specification that tracking following zoom in/zoom out appears successful/unsuccessful, specification that object being tracked should be changed (e.g. plane #1 rather than plane #2 should be tracked) specification that smaller/larger object should be tracked (e.g. part of truck rather than whole truck should be tracked or vice versa; e.g. three trucks rather than two trucks should be tracked or vice versa), specification that the tracked object does not appear to be centered in the real time image, specification that the reference image does not sufficiently accurately reflect the tracked object (and/or is not sufficiently similar to the real time image) and therefore should be updated, specification of desired polarity (e.g. if targeted object is "hot" the object should be displayed in a bright color but if targeted object is "cold" the object should be displayed in a dark color), specification that reference image should be updated more frequently or less frequently, etc.

In various instances, input interface module(s) 160 may include any appropriate input interface(s) (e.g. joystick, keypad, keyboard, mouse, touch-screen display, microphone etc.)

It is noted that one characteristic which allows system 100 to function as an advantageous object tracking system is the outputting of the reference image to the operator. The outputting of reference image(s) to the operator instead of or in addition to real time image(s) is an improvement compared to the outputting of just real time images, for any of the following reasons. First, the real time image which is acquired and displayed to the operator typically (although not necessarily) changes from frame to frame, as it is assumed that the tracked object is typically (although not necessarily) moving. Typically (although not necessarily), in contrast, the outputted reference image remains constant for a longer period of time. Therefore, in some cases where there is a slower rate of updating in reference image compared to the updating in real time image, the human operator may have more time to analyze the reference image before the reference image is updated and hence may analyze the reference image more accurately than if analysis were instead performed on the real time image. The analysis may in some instances include taking measurements, etc. Second, the reference image may be used in some cases by tracker module(s) 140 when seeking the tracked object in the real time image. Therefore, if the operator has access to the reference image, the operator does not have to necessarily "trust" the tracking performed by tracker module(s) 140 and may in some cases oversee the tracking in a more effective manner than if tracker module(s) 140 had more data (i.e. the reference image) than the operator. Third, the analysis of the outputted reference image(s) (possibly vis-a-vis real time image(s) and/or other information) may be performed in some instances offline, with the analysis result(s) used for example to train operator(s), and/or to further develop the working of tracker module(s) 140. Fourth, operator access to the outputted reference image(s) may in some cases allow the operator to provide, or assist the operator in providing, appropriate input in reaction via input interface module(s) 160 to tracker module(s) 140. For instance, if the operator notices that the tracking is about to be lost, the operator may choose to provide input to cause tracking to end and/or to start again. In another instance, additionally or alternatively, if the reference image does not sufficiently accurately reflect the tracked object (and/or is not sufficiently similar to the real time image), the operator may choose to specify that the reference image should be updated and/or to provide input which would enable tracker module(s) 140 to update (improve) the reference image. In another instance, additionally or alternatively, if the reference image lacks data which may assist in the tracking, the operator may choose to provide such input which can be used by tracker module(s) 140 instead of, or in addition to, the reference image when seeking the tracked object in the real time image. It is noted that in some cases, analysis, overseeing, development, training, and/or input, etc. by the operator may be based additionally or alternatively on outputted real time image(s) and/or other outputted information, and that the current subject matter does not preclude the operator from additionally or alternatively benefiting from the display of real time image(s) and/or other information.

Any of the modules in FIG. 1 may be made up of any combination of software, hardware and/or firmware that performs the functions as described and explained herein. In some cases, system 100 or a part thereof may comprise a machine specially constructed for the desired purposes, and/or may comprise a programmable machine selectively activated or reconfigured by specially constructed program code. In some cases, system 100 includes at least some hardware.

Alternatively to the example shown in FIG. 1, system 100 may in some examples include fewer, more and/or different modules than shown in FIG. 1. Alternatively to the example shown in FIG. 1, the functionality of system 100 may in some examples be divided differently among the modules illustrated in FIG. 1. For instance, although for simplicity of description input interface module(s) 160 is shown separate from output/interface module(s) 180 in FIG. 1, in some cases one or more input interface module(s) 160 may be combined with one or more output interface modules 180, e.g. in a touch screen display. Alternatively to the example shown in FIG. 1, system 100 may in some examples include additional, less, and/or different functionality.

Below the terms input interface 160, output interface 180, tracker 140 and image source 120 are used to connote one or more input interface module(s) 160, one or more output interface module(s) 180, one or more tracker module(s) 140, and one or more image source module(s) 120, respectively.

Figure 2:
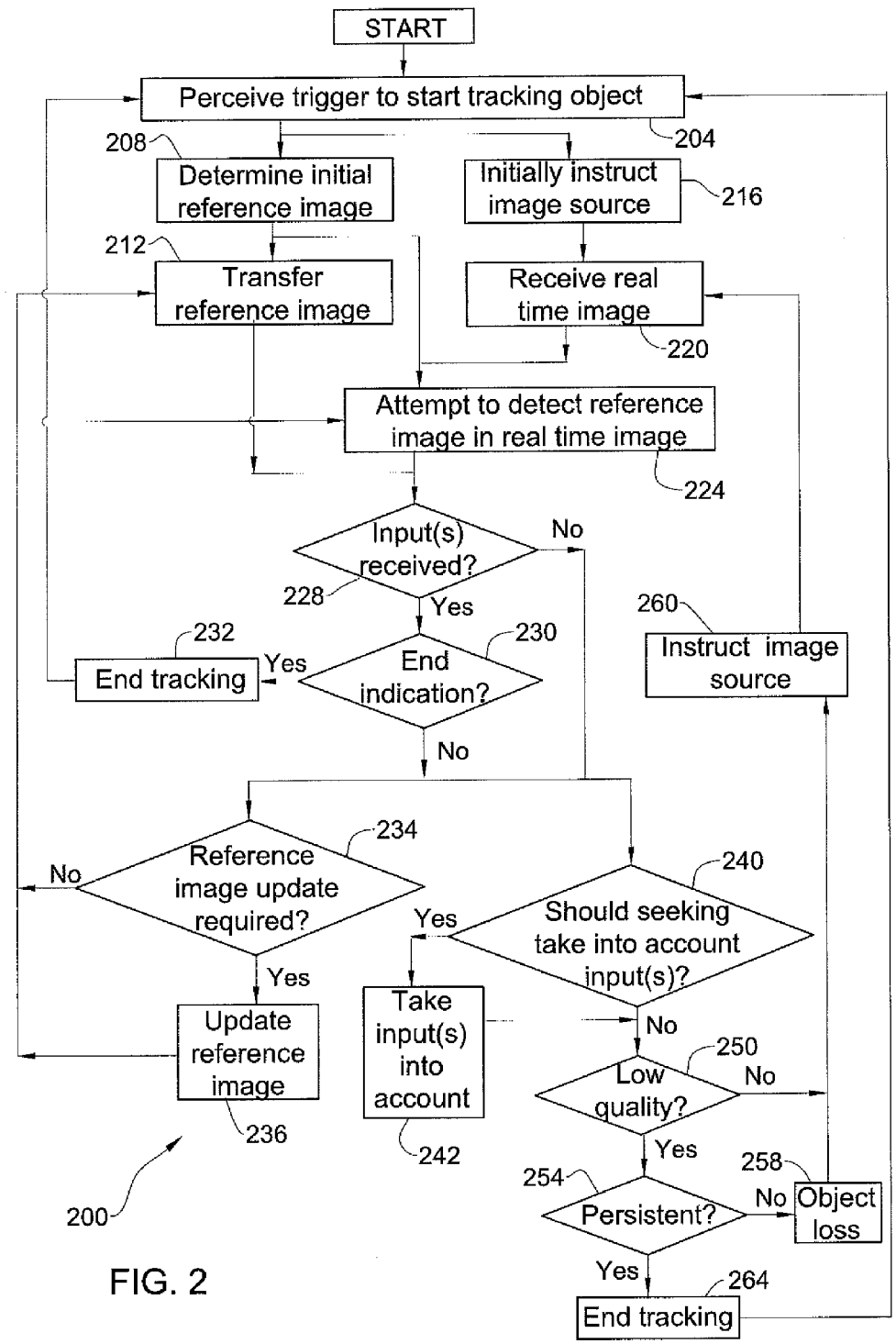
FIG. 2 is a flowchart illustrating an example of a tracking method, in accordance with the presently disclosed subject matter.

FIG. 2 is a flowchart illustrating an example of a tracking method 200, in accordance with the presently disclosed subject matter. In the illustrated example, it is assumed that method 200 is performed by tracker 140.

In the illustrated example in stage 204, tracker 140 perceives a trigger to start tracking an object.

In some instances, the trigger may include the receipt of an indication to start tracking an object from input interface 160. For instance, an operator may specify via input interface 160 an object displayed in a real time image. In some cases, the operator may specify the object by overlaying crosshairs or another symbol on the center of the object, or the operator may enclose as much as possible of the object in a predetermined shape such as a rectangle. An indication of the object may then be transferred to tracker 140. This indication may also function as an indication to tracker 140 to start tracking the object, or a separate indication to start tracking may also be inputted by the operator via input interface 160 and transferred to tracker 140.

Additionally or alternatively, in other instances, the trigger may include automatic discerning of an object to be tracked in a real time image.

In the illustrated example, upon perceiving the trigger, tracker 140 determines an initial reference image for the object to be tracked (stage 208) and provides instruction(s) so that image source 120 will acquire image(s) which should include the tracked object (stage 216).

In the illustrated example, in stage 208, tracker 140 determines an initial reference image for tracking the object. For instance, the initial reference image may include the indicated object as displayed in the real time image. Continuing with this instance, if the operator had specified the object in the real time image using a predetermined shape, the reference image may in some cases comprise the pixels encompassed by the predetermined shape. Continuing with this instance, if the operator had instead specified the object by overlaying a symbol on the center of the object in the real time image, then in some cases tracker 140 may decide which pixels directly under and around the symbol should be part of the object (e.g. by forming a window around the symbol) and the reference image may in some of these cases comprise these pixels. In another instance, the initial reference image may include the detected object as displayed in the real time image. Continuing with this instance, the reference image may in some cases comprise the pixels which enabled detection of the object.

In the illustrated example, in stage 212, tracker 140 transfers the reference image (determined in stage 208) to output interface 180. In some cases, the reference image may be displayed to the operator integrated with a real time image, for instance as a picture within a larger picture of a real time image.

In the illustrated example in stage 216, tracker 140 transfers instruction(s) to image source 120 so that image source 120 will acquire a new (subsequent) image which should include the object that is being tracked. For instance, the initial instruction(s) may allow centering of the object in the new real time image. In some cases of this instance, the initial instruction(s) may include an indication of the difference (zero or not zero) between the center of the object being tracked and the center of the real time image via which the object was specified or automatically discerned (e.g. gimbal error).

In the illustrated example, in stage 220, tracker 140 receives a new real time image from image source 120. Optionally tracker 140 may additionally receive other information from image source 120 (e.g. zoom value, change in zoom value, etc). Although stage 220 is illustrated after stage 216 in FIG. 2, in other examples, the times of receipt of real time images (in stage 220) is not controlled by tracker 140 and therefore may occur independently of the performance of stage 216.

In the illustrated example, once tracker 140 has determined the initial reference image (stage 208) and received a new real time image (stage 216), tracker may attempt to detect the reference image in the new real time image (stage 224).

In the illustrated example, in stage 224, tracker 140 attempts to detect the reference image in the real time image by correlating the reference image with the real time image. For instance, two dimensional correlation may include comparing each pixel in the reference image with each pixel in the real time image.

In the illustrated example, in optional stage 228, tracker 140 may receive input(s) from input interface 160. In some examples, stage 228 may occur at any time (meaning that input(s) may be received at any time) and not necessarily at the point in the process shown in the example of FIG. 2. In some cases the inputting by the operator is made possible or facilitated by the operator having access to one or more outputted reference image(s), or to both outputted reference image(s) and real time image(s) and/or other information. In other cases, the operator may have been just as easily arrived at the input from viewing real time image(s) alone. Depending on the instance, tracker 140 may or may not have the discretion whether to use or ignore/discard certain input. In instances where tracker 140 may discard/ignore certain input, the following stages refers to input that has not been discarded/ignored.

If input(s) had been received in stage 228 (yes to stage 228) then in the illustrated example it is determined in stage 230 whether or not the input(s) included an end tracking indication. If the input(s) included an end tracking indication (yes to stage 230), then in the illustrated example, tracker 140 ends tracking in stage 232, stopping seeking the tracked object in the real time image and stopping updating the reference image. In some instances when tracking ends, tracker 140 continues to transfer (arbitrary) instructions to image source 120, but in other instances tracker 140 ceases transfer of instructions. Additionally or alternatively, in some instances when tracking ends, tracker 140 continues to transfer the same (most recent) reference image to output interface 180 but in other instances the transfer ends. Additionally or alternatively, in some instances when tracking ends real time images or processed versions thereof continue to be transferred to output interface 180 (by tracker 140 and/or by image source 120), e.g. so that an operator can use the real time images to start a new tracking. In the illustrated example, after stage 232 method 200 iterates back to stage 204 with tracker 140 on standby, waiting until perceiving of a new trigger to start tracking.

If the input did not include an end tracking indication (no to stage 230), or if no input was received (no to stage 228) then in the illustrated example, method 200 continues to stage 234 and/or stage 240.

In the illustrated example, in stage 234 tracker 140 determines whether or not the reference image should be updated, for instance based on result(s) of attempting to detect the reference image within real time image(s), other information received from image source 120, and/or received input(s). Typically although not necessarily, in most iterations of stage 234 it is not deemed necessary to update the reference image, meaning that the rate of updating the reference image by tracker 140 when tracking a specific object is typically although not necessarily slower than the rate of acquiring the real time images by image source 120 when tracking the specific object.

If the reference image should be updated (yes to stage 234) then in the illustrated examples in stage 236, tracker 140 updates the reference image, for instance based on the received real time image, other information received from image source 120 and/or received input(s).

In the illustrated example, if the reference image should not be updated (no to stage 234), then stage 236 is omitted.

In some cases, only input(s) received in the current iteration of stage 228 are considered when performing stage 234 and/or 236, whereas in other cases, input(s) received in any iteration of stage 228 for the current tracking may be considered when performing stage 234 and/or 236.

In the illustrated example in a reiteration of stage 212, tracker 140 transfers the reference image (which may or may not have been updated) to output interface 180. In some cases, tracker 140 also transfers the real time image (as received in stage 220 or after additional processing) to output interface 180. In these cases, the reference image and real time image may be transferred separately, or may be transferred in an integrated format, for instance the reference image as a picture in the larger picture of the real time image. Additionally or alternatively, in some cases tracker 140 also transfers other information received in stage 220 from image source module(s) 120 (e.g. zoom value, change in zoom value, etc) to output interface 180.

In the illustrated example, in stage 240, it is determined whether or not there is received input(s) that should also be taken into account in seeking the tracked object in the real time image. If no (no to stage 240), then in the illustrated example, it is assumed that the performance of stage 224 (attempt to detect the reference image in the real time image) fulfills the seeking and no additional activity is required. Stage 242 may therefore be omitted. If it is instead determined that there is received input(s) that should also be taken into account (yes to stage 240), then in the illustrated example in stage 242 received input(s) are taken into account in seeking the tracked object in the real time image. Depending on the instance, stage 242 may be performed, before, after or at the same time as detecting stage 224. In instances where stage 242 is performed before stage 224, the outcome of stage 242 may in some of these instances affect the performance of stage 224.

In some cases, only input(s) received in the current iteration of stage 228 are considered when performing stage 240 and/or 242, whereas in other cases, input(s) received in any iteration of stage 228 for the current tracking may be considered when performing stage 240 and/or 242.

In the illustrated example, in stage 250, tracker 140 determines whether or not the seeking indicated that the tracking is of poor quality.

In the illustrated example, if it is determined that the tracking is of poor quality (yes to stage 250) then in stage 254, tracker 140 determines whether or not the poor quality has persisted for a predetermined amount of time (e.g. over a predetermined number of real time images). If the poor quality has persisted for a predetermined amount of time (yes to stage 254), then in the illustrated example tracker 140 ends tracking in stage 264, stopping seeking the tracked object in the real time image and stopping updating the reference image. In some instances when tracking ends, tracker 140 continues to transfer (arbitrary) instructions to image source 120, but in other instances tracker 140 ceases transfer of instructions. Additionally or alternatively, in some instances when tracking ends, tracker 140 continues to transfer the same (most recent) reference image to output interface 180 but in other instances the transfer ends. Additionally or alternatively, in some instances when tracking ends real time images or processed versions thereof continue to be transferred to output interface 180 (by tracker 140 and/or by image source 120), e.g. so that an operator can use the real time images to start a new tracking. In the illustrated example, after stage 264, method 200 iterates back to stage 204 with tracker 140 on standby, waiting until receipt of a new indication to start tracking.

If instead the poor quality has not persisted for a predetermined amount of time (no to stage 254) then in the illustrated example tracker 140 concludes in stage 258 that there has been an "object loss" or that there continues to be an object loss. In some cases, tracker 140 transfers an indication of poor quality (e.g. object loss) to output interface 180 for output to the operator.

In the illustrated example, if instead it is determined that the quality is sufficiently high (no to stage 250), or after stage 258, tracker 140 transfers instruction(s) to image source 120 in stage 260. For instance, the instruction(s) may be based on the result(s) of the seeking of the tracked object in the real time image. In some cases of this instance, the instruction(s) may include at least the difference (zero or non-zero) of the estimated center of the tracked object with respect to the center of the real time image (e.g. gimbal error).

In some instances, where the quality is sufficiently high (no to stage 250) or the low quality is not persistent (no to stage 254) tracker 140 may transfer indications of seeking result(s) (e.g. the estimated center of the tracked object in a real time image, correlation matrix, correlation number(s), etc.) to output interface 180.

In the illustrated example, after stage 260, method 200 iterates back to stage 220 waiting to receive the next real time image. However in other examples, the times of receipt of real time images (in stage 220) is not controlled by tracker 140 and therefore may occur independently of the performance of stage 260.

In some instances, after a conclusion of object loss (stage 258), tracker 140 may instead change the tracking mode to memory mode or may maintain memory mode if tracking is already in that mode. For instance, in some cases of memory mode, after a conclusion of object loss (stage 258) tracker 140 may replace the current reference image, e.g. with a reference image which is based on the last real time image, tracker 140 may transfer the replacement reference image to output interface 180, and tracker 140 may instruct image source 120 based on the seeking result having included a conclusion of object loss. In some examples of these cases, the instruction(s) may include indication(s) which is/are appropriate to memory mode (e.g. a gimbal error of zero so that image source 120 maintains the direction of pointing and/or other indication(s) to retain status quo parameters (e.g. speed)). Continuing with these cases, after receiving the next real time image tracker 140 may then proceed to attempt to detect the replacement reference image in the received real time image, followed by stages 228 to 250. In these cases, based on stages 250 and 254, and/or 258 it is determined if there is again a conclusion of object loss and memory mode should be continued for another iteration. In these cases, therefore, memory mode may continue until an iteration where quality is sufficiently high (no to stage 250) or low quality has persisted for a predetermined amount of time (yes to stage 264).

In some instances, stage 264 may instead follow stage 258, meaning that tracking would end after a conclusion of object loss (stage 258).

In some instances, at any stage of method 200, tracker 140 may transfer comments and/or support information to output interface 180.

Figure 3:
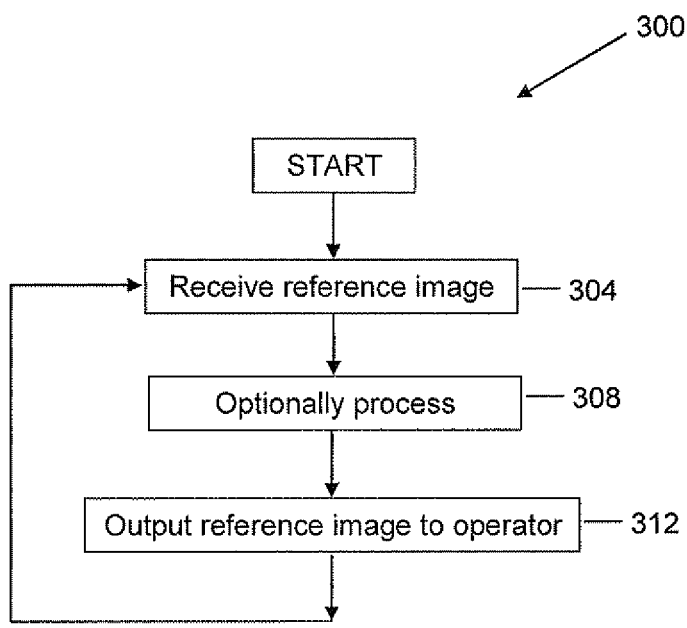
FIG. 3 is a flowchart illustrating an example of a method of interfacing with an operator regarding object tracking, in accordance with the presently disclosed subject matter.

FIG. 3 is a flowchart illustrating an example of a method 300 of interfacing with an operator regarding object tracking, in accordance with the presently disclosed subject matter. In the illustrated example, it is assumed that method 300 is performed by output interface 180.

In the illustrated example in stage 304, output interface 180 receives a reference image from tracker 140. In some cases, output interface 180 receives the reference image integrated with a real time image, for instance picture in a picture. However in other cases, output interface 180 receives the reference image independently.

In the illustrated example, in optional stage 308, output interface 180 optionally processes the reference image. The processing may include any type of processing. For instance in some cases, the contrast in the reference image may be increased or decreased, the reference image may filtered, the reference image may be integrated with an independently received real time image (e.g. picture in a picture), the reference image may be integrated with independently received other information, other image related processing may be performed, and/or any other processing may be performed, etc.

In the illustrated example, in stage 312, output interface 180 outputs the reference image (as received or after processing) to the operator.

Figure 6:
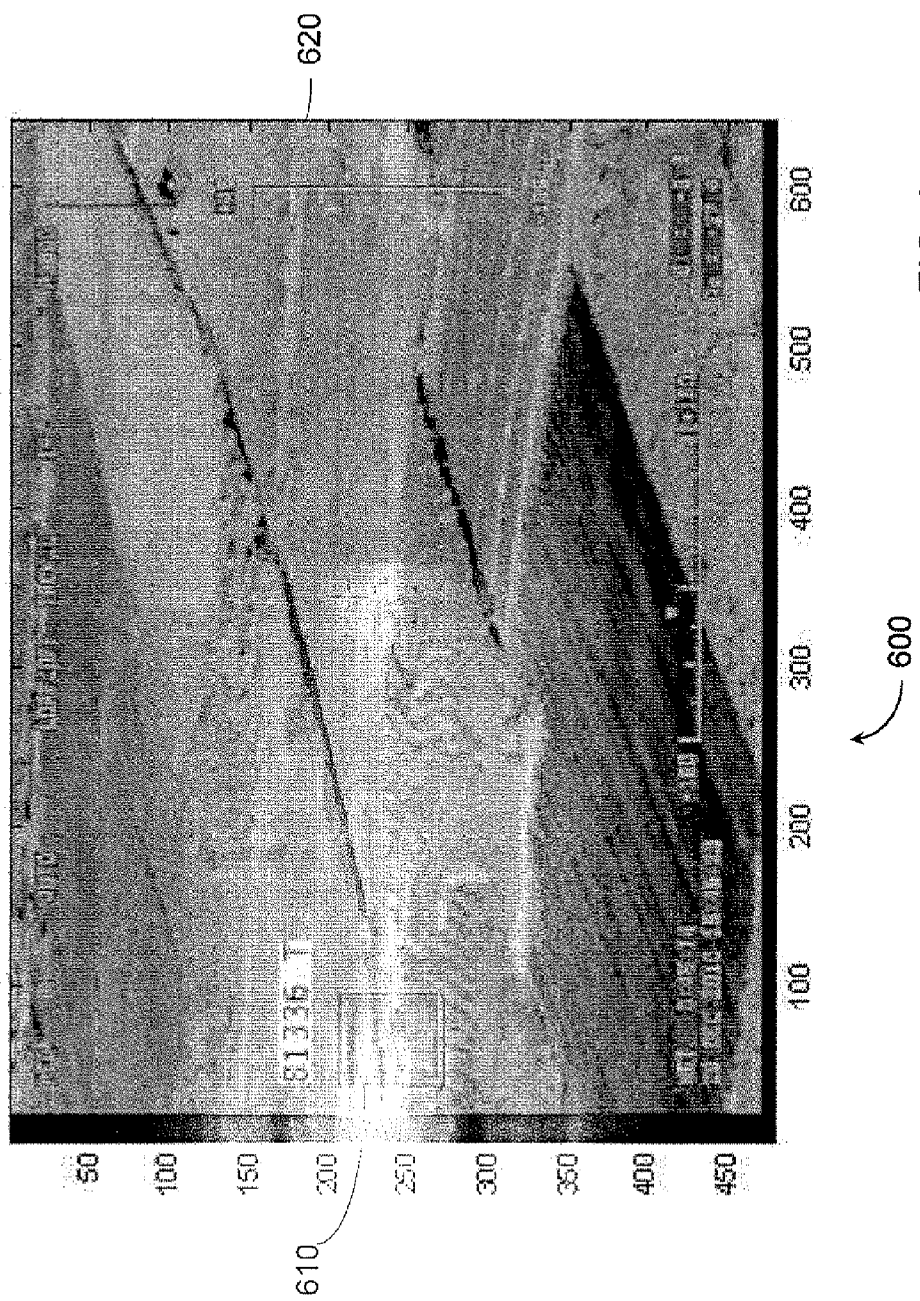
FIG. 6 is an illustration of a reference image displayed as a picture in a larger picture of a real time image, in accordance with the presently disclosed subject matter.

In some instances both reference images and real time images are received by output interface 180. In some of these instances, real time images may be transferred to output interface 180 by tracker 140 (either integrated with reference images or separately) where the transferred real time images may be as received by tracker 140 from image source 120 or after processing. In some other of these instances, real time images may instead be transferred to output interface 180 by image source 120. In instances where reference images and real time images are received by output interface 180, the reference images (as received or after processing) and the real time images (as received or after processing) may be outputted using the same module(s) of output interface 180 or using different module(s) of output interface 180, depending on the example. For example, the same display may present reference and real time images, or one display may present a reference image and a different display a real time image. In instances where the same output interface is used, the disclosure does not impose limitations on the presentation of the two outputted images using the same output interface. In some cases, the two outputted images are presented in an arrangement which facilitates operator tracking analysis, operator overseeing of the tracking, operator training and/or operator input in reaction to the tracking. In one instance where the same output interface is used, the reference image is presented as a picture within a larger picture of the real time image. For example, FIG. 6 is an illustration 600 of a reference image 610 displayed as a picture in a larger picture of a real time image 620, in accordance with the presently disclosed subject matter. FIG. 6 is provided to aid in reader understanding of one possible example of an arrangement for outputting reference images and real time images on the same output interface, but it should be understood that many other possible arrangements (with varying positions, sizes, and/or contrasts, etc.) may be used in other examples.

In some cases, in addition to images, output interface 180 may also receive, process and/or output other information originating from tracker 140 and/or image source 120 (such as indication(s) of seeking result(s) (e.g. the estimated center of the tracked object in a real time image, correlation number(s), correlation matrix, object loss), end indication(s), start indication(s), information determined by image source module(s) 120 (e.g. zoom value, change in zoom value, etc), comments, and/or support information, etc. In various cases of these instances, some or all of the information (as received or after processing) may be outputted on the same or different output interface module(s) as the reference images (and/or as the real time images, if outputted). For example, the same display may present reference images, the displayed information (and possibly real time images), or two or more displays may be used to display a reference image, the displayed information (and possibly a real time image). In instances where the same output interface is used, the disclosure does not impose limitations on the presentation using the same output interface. In some cases, the displayed information and the real time and/or reference image may be arranged in the integrated image in an arrangement which facilitates analysis, overseeing, development, training, and/or inputting, etc. by an operator.

After stage 312, method 300 iterates back to stage 304 for the next receipt of a reference image. However in other examples, the times of receipt of reference images is not controlled by output interface 180 and therefore may occur independently of the performance of stage 312.

Figure 4:
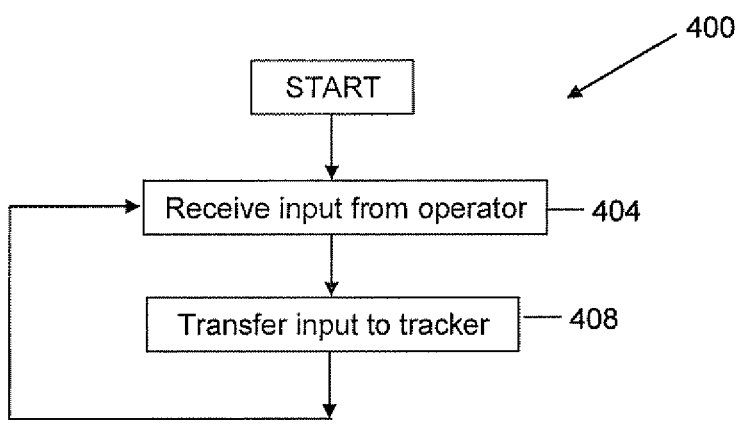
FIG. 4 is another flowchart illustrating an example of a method of interfacing with an operator regarding object tracking, in accordance with the presently disclosed subject matter.

FIG. 4 is a flowchart illustrating an example of a method 400 of interfacing with an operator regarding object tracking, in accordance with the presently disclosed subject matter. In the illustrated example, it is assumed that method 400 is performed by input interface 160.

In stage 404, input interface 160 receives one or more input(s) from an operator.

In some instances, the inputting by the operator is made possible or facilitated by the operator having access to one or more outputted reference images (solely or in addition to real time image(s) and/or other information).

The types of input which an operator is allowed to input may vary, depending on the instance. In some instances, the only input allowed includes indication to start tracking (e.g. by overlaying a symbol or enclosing within a predetermined shape in order to specify object to be tracked, etc) and/or indication to end tracking. In other instances, any of the following input(s) may be allowed: start tracking indication, end tracking indication, one or more dimensions of the object being tracked, location information relating to object being tracked, color information relating to object being tracked, specification that center of reference image should be changed to a different point (e.g. center of reference image should be moved to center of boat from side of boat), specification of center of object, specification that tracking following zoom in/zoom out appears successful/unsuccessful, specification that object being tracked should be changed (e.g. plane #1 rather than plane #2 should be tracked) specification that smaller/larger object should be tracked (e.g. part of truck rather than whole truck should be tracked or vice versa; e.g. three trucks rather than two trucks should be tracked or vice versa), specification that the tracked object does not appear to be centered in the real time image, specification that the reference image does not sufficiently accurately reflect the tracked object (and/or is not sufficiently similar to the real time image) and therefore should be updated, specification of desired polarity (e.g. if targeted object is "hot" the object should be displayed in a bright color but if targeted object is "cold" the object should be displayed in a dark color), specification that reference image should be updated more frequently or less frequently, etc.

In the illustrated example, in stage 408, some or all of input(s) received from the operator is/are transferred to tracker 140 for use in object tracking.

In the illustrated example, after stage 408 method 400 iterates back to stage 404 awaiting the next input from the operator. However in other examples, the times of receipt of input(s) is not controlled by input interface 160 and therefore may occur independently of the performance of stage 408.

Figure 5:
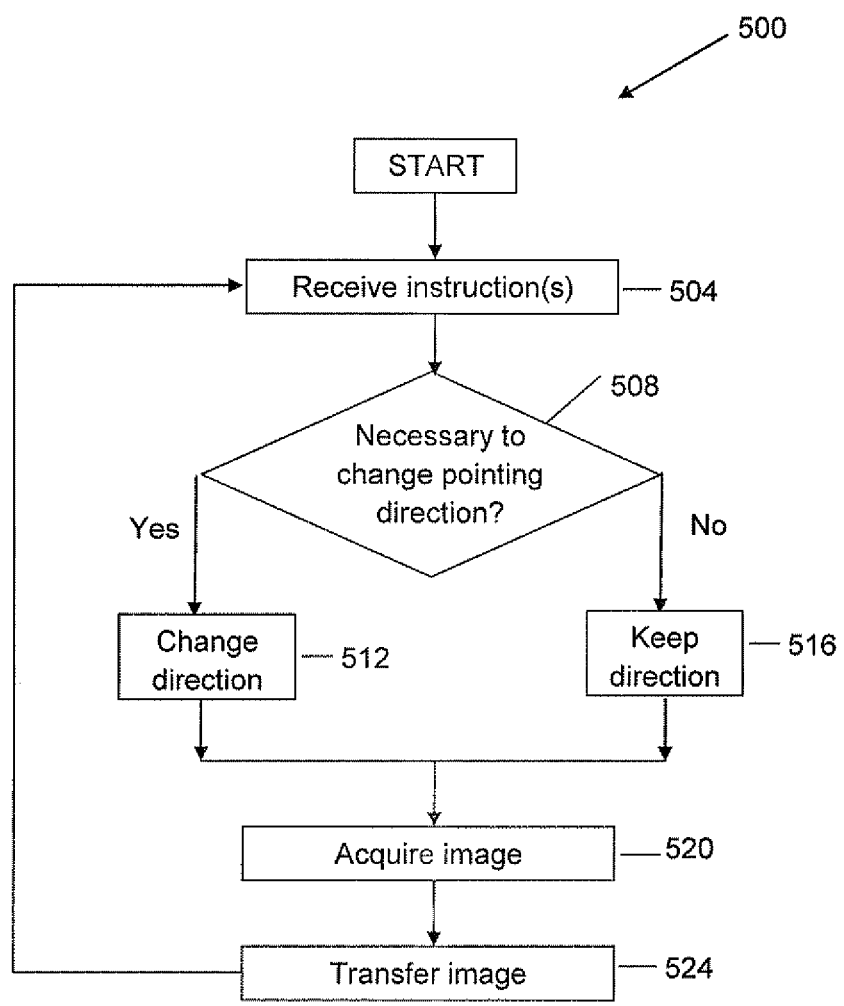
FIG. 5 is a flowchart illustrating an example of a method of acquiring a real time image for use in object tracking, in accordance with the presently disclosed subject matter.

FIG. 5 is a flowchart illustrating an example of a method 500 of acquiring a real time image for use in object tracking, in accordance with the presently disclosed subject matter. In the illustrated example, it is assumed that method 500 is performed by image source 120.

In the illustrated example, in stage 504, image source 120 receives from tracker 140 instruction(s). Typically although not necessary the instruction(s) are meant to enable the acquisition of an image which should include the object that is being tracked. For instance, initial instruction(s) at the start of tracking may allow centering of the object indicated by the operator or automatically discerned in the next real time image. In some cases of this instance, the initial instruction(s) may include an indication of the difference (zero or not zero) between the center of the object to be tracked and the center of the real time image via which the object was specified or automatically discerned (e.g. gimbal error). In another instance, if the instruction(s) received are not the initial instruction(s), the instruction(s) may in some cases include an indication of the difference (zero or not zero) between the estimated center of the object in the real time image and the center of that real time image (e.g. gimbal error). In another instance, under memory mode, the instruction(s) may include indication(s) which is/are appropriate to memory mode. In some cases of this instance, the instruction(s) may include a gimbal error of zero and/or other indication(s) to retain status quo parameters (e.g. speed). In another instance where tracking has ended, if instructions have not ceased entirely, the received instruction(s) may be arbitrary.

In the illustrated example, in stage 508, it is determined whether or not the received instruction(s) necessitates image source 120 to point in a different direction when acquiring the next image. For instance, if the instruction(s) included a difference (e.g. gimbal error), then in some cases if the difference was zero, then image source 120 does not need to change the direction of pointing, whereas if the difference was non-zero then image source 120 does need to change the direction of pointing in order to try to center the tracked object in the field of view.

If the instruction(s) necessitates image source 120 to point in a different direction (yes to stage 508) then in the illustrated example in stage 512, image source 120 changes the direction in which image source 120 is pointing. Otherwise, if the instruction(s) does not necessitate image source 120 to point in a different direction (no to stage 508), then in the illustrated example in stage 516 image source 120 keeps pointing in the same direction. Additionally or alternatively, in some instances, if no instruction(s) is received, image source 120 maintains the same pointing direction.

In the illustrated example in stage 520, image source 120 acquires an image. Typically although not necessarily the acquired image includes the tracked object. In some instances, image source 120 acquires images at a predetermined rate, regardless of the rate of receipt of instructions.

In the illustrated example, in stage 524 image source 120 transfers the real time image to tracker 140 and optionally to output interface 180.

In the illustrated example, after stage 524, method 500 iterates back to stage 504, awaiting receipt of the next instruction(s). However in other examples, the times of receipt of instruction(s) is not controlled by image source 120 and therefore may occur independently of the performance of stage 524.

Alternatively to the examples shown in FIGS. 2, 3, 4 and/or 5, stages which are shown in FIGS. 2, 3, 4 and/or 5 as being executed sequentially may in some examples be executed in parallel and/or stages shown in FIGS. 2, 3, 4 and/or 5 as being executed in parallel may in some examples be executed sequentially. Alternatively to the examples shown in FIGS. 2, 3, 4 and/or 5, respective method 200, 300, 400, and/or 500 may in some examples include more, less and/or different stages than illustrated in FIGS. 2, 3, 4 and/or 5 respectively. Alternatively to the examples shown in FIGS. 2, 3, 4 and/or 5, stages may in some examples be executed in a different order than illustrated in FIGS. 2, 3, 4 and/or 5.

It will also be understood that the subject matter contemplates that a system or part of a system disclosed herein may be for example a suitably programmed machine. Likewise, the subject matter contemplates, for example, a computer program being readable by a machine for executing a method or part of a method disclosed herein. Further contemplated by the subject matter, for example, is a machine-readable memory tangibly embodying program code readable by the machine for executing a method or part of a method disclosed herein.

While examples of the subject matter have been shown and described, the subject matter is not thus limited. Numerous modifications, changes and improvements within the scope of the subject matter will now occur to the reader.

The invention claimed is:

1. A system for object tracking, comprising:
at least one processor configured to act as a tracker configured to:
receive real time images from time $t_0$, at least for tracking an object in said real time images,
determine a first reference image of the tracked object,
track the object in at least real time images received after time $t_0$ based at least partly on the first reference image,
provide the first reference image to an output interface, so that the operator can view, during the tracking, each of said real time images received after time $t_0$ at the same time as the first reference image,
perform at least steps ($S1_i$), ($S2_i$) and ($S3_i$) for i=1:
($S1_i$) at time $t_i$, perform an update to a new reference image which is calculated based on at least two of the real time images received from time $t_{i-1}$ to time $t_i$, wherein the tracked object as appearing in the new reference image is not identical to the tracked object as appearing in any of the real time images received from time $t_{i-1}$ to time $t_i$,
($S2_i$) track the object in at least a plurality of real time images received after time $t_i$, based at least partly on the new reference image,
($S3_i$) provide the new reference image to an output interface, so that the operator can view each real time image of said plurality of real time images received after time $t_i$ at the same time as the new reference image, and
repeat at least once steps ($S1_i$), ($S2_i$) and ($S3_i$), wherein the value of i is incremented by one at each repetition.

2. The system of claim 1, wherein said tracker is further configured to receive an input provided by the operator, and to consider at least said input when performing at least one of: determining at least one of said first reference image and said new reference image, or tracking the object in the real time images.

3. The system of claim 1, wherein said tracker is further configured to perform at least one of the following: start object tracking or end object tracking.

4. The system of claim 1, further comprising:
the output interface configured to output at least said first reference image and said new reference image to said operator.

5. The system of claim 1, further comprising:
an input interface configured to receive an input from said operator, and to provide said input to said tracker.

6. The system of claim 1, wherein said tracker is further configured to issue a subsequent instruction based on a result of said tracking for acquiring a subsequent real time image.

7. The system of claim 1, further comprising:
an image source configured to receive a subsequent instruction which was issued by said tracker based on a result of said tracker tracking said object in the real time images, and configured to acquire a subsequent real time image at least partly based on said received instruction.

8. The system of claim 7, wherein said image source changes or does not change direction of pointing when acquiring said subsequent image, at least partly based on said received instruction.

9. The system of claim 5, wherein said input includes at least one selected from the group consisting of start tracking indication, end tracking indication, one or more dimensions of the object being tracked, location information relating to object being tracked, color information relating to object being tracked, specification that center of at least one of the first reference image and the new reference image should be changed to a different point, specification of center of object, specification that tracking following zoom in/zoom out appears successful/unsuccessful, specification that object being tracked should be changed, specification that smaller/larger object should be tracked, specification that the tracked object does not appear to be centered in the real time images, specification that at least one of the first reference image and the new reference image should be updated, specification of desired polarity, and specification that the new reference image should be updated more frequently or less frequently.

10. The system of claim 4, wherein at least one of the first reference image and the new reference image is outputted as a picture within a larger picture of one or more of the real time images.

11. A method, comprising:
receiving real time images from time $t_0$, at least for tracking an object in said real time images utilizing at least one processor;
determining a first reference image of the tracked object,
tracking the object in at least real time images received after time $t_0$ based at least partly on the first reference image,
providing the first reference image to an output interface, so that the operator can view, during the tracking, each of said real time images received after time $t_0$ at the same time as the first reference image,
perform at least steps ($S1_i$), ($S2_i$) and ($S3_i$) for i=1:
  ($S1_1$) at time $t_i$, perform an update to a new reference image which is calculated based at least on at least two of the real time images received from time $t_{i-1}$ to time $t_i$, wherein the tracked object as appearing in the new reference image is not identical to the tracked object as appearing in any of the real time images received from time $t_{i-1}$ to time $t_i$,
  ($S2_i$) tracking the object in at least a plurality of real time images received after time $t_i$, based at least partly on the new reference image,
  ($S3_i$) providing the new reference image to an output interface, so that the operator can view each real time image of said plurality of real time images received after time $t_i$ at the same time as the new reference image, and
repeat at least once steps ($S1_i$), ($S2_i$) and ($S3_i$), wherein the value of i is incremented by one at each repetition.

12. The method of claim 11, further comprising:
receiving input provided by the operator; and
considering at least said input when performing at least one of determining at least one of said first reference image and said new reference image, or tracking said object in the real time images.

13. The method of claim 11, further comprising:
outputting at least said first reference image and said new reference image to said operator.

14. The method of claim 11, further comprising:
receiving input from said operator; and
providing said input for use in tracking said object.

15. The method of claim 11, further comprising:
issuing a subsequent instruction based on a result of said tracking for acquiring a subsequent real time image.

16. The method of claim 11, further comprising:
receiving a subsequent instruction which was issued based on a result of said tracking said object in the real time images; and
acquiring a subsequent real time image at least partly based on said received instruction.

17. The method of claim 16, wherein said acquiring includes:
changing or not changing direction of pointing, at least partly based on said received instruction.

18. The method of claim 14, wherein said input includes at least one selected from the group consisting of start tracking indication, end tracking indication, one or more dimensions of the object being tracked, location information relating to object being tracked, color information relating to object being tracked, specification that center of at least one of the first reference image and the new reference image should be changed to a different point, specification of center of object, specification that tracking following zoom in/zoom out appears successful/unsuccessful, specification that object being tracked should be changed, specification that smaller/larger object should be tracked, specification that the tracked object does not appear to be centered in the real time image, specification that at least one of the first reference image and the new reference image should be updated, specification of desired polarity, and specification that the new reference image should be updated more frequently or less frequently.

19. The method of claim 13, wherein at least one of the first reference image and the new reference image is outputted as a picture within a larger picture of one or more of the real time images.

20. A computer program product comprising a non-transitory computer useable medium having computer readable program code embodied therein, the computer program product comprising computer readable program code for causing a computer to:
receive real time images from time $t_0$, at least for tracking an object in said real time images,
determine a first reference image of the tracked object,
track the object in at least real time images received after time $t_0$ based at least partly on the first reference image,
provide the first reference image to an output interface, so that the operator can view, during the tracking, each of said real time images received after time $t_0$ at the same time as the first reference image,
perform at least steps ($S1_i$), ($S2_i$) and ($S3_i$) for i=1:
  ($S1_i$) at time $t_i$, perform an update to a new reference image which is calculated based on at least two of the real time images received from time $t_{i-1}$ to time $t_i$, wherein the tracked object as appearing in the new reference image is not identical to the tracked object as appearing in any of the real time images received from time $t_{i-1}$ to time $t_i$, (S2$_i$) track the object in at least a plurality of real time images received after time $t_i$, based at least partly on the new reference image, (S3$_i$) provide the new reference image to an output interface, so that the operator can view each real time image of said plurality of real time images received after time $t_i$ at the same time as the new reference image, and repeat at least once steps (S1$_i$), (S2$_i$) and (S3$_i$), wherein the value of i is incremented by one at each repetition.

21. The computer program product of claim 20, further comprising:
computer readable program code for causing the output interface to output said first reference image and said new reference image to an operator.

22. The computer program product of claim 20, further comprising:
computer readable program code for causing the computer to receive an input from an operator; and
computer readable program code for causing the computer to provide said input for use in tracking said object.

23. The computer program product of claim 20, further comprising:
computer readable program code for causing the computer to receive a subsequent instruction which was issued based on a result of said tracking of said object in a real time image; and
computer readable program code for causing the computer to acquire a subsequent real time image at least partly based on said received instruction.

24. The system of claim 1, wherein said tracker is further configured to receive an input provided by the operator after the first reference image or the new reference image has been outputted to the operator.

25. The system of claim 1, wherein said tracker being configured to track the object includes the tracker being configured to correlate at least one of the first reference image and the new reference image with one or more of the real time images.

26. The system of claim 1, wherein at least part of the system is configured to be located on or in a moving vehicle or craft.

27. The system of claim 1, wherein the real time images are provided for output to the operator by the tracker.

28. The system of claim 27, wherein each of said real time image received from time to $t_0$ time $t_1$ is provided integrated with the first reference image and each real time image of said plurality of real time images received after time $t_i$ is provided integrated with the new reference image.

29. The system of claim 28, wherein at least one of the first reference image and the new reference image is provided as a picture within a larger picture of one or more of the real time images.

30. The system of claim 27, wherein separated real time and reference images are provided.

31. The system of claim 1, wherein the tracker is further configured to process at least one of the first reference image, the new reference image and the real time images.

32. The system of claim 1, wherein the real time images are provided for output to the operator by an image source.

33. The system of claim 1, wherein said tracker is configured to receive a plurality of real time images and to determine a plurality of reference images of the tracked object, and wherein another reference image is determined each time another real time image is received.

34. The system of claim 4, wherein the output interface is further configured to output the real time images on a separate output interface module than used for outputting the reference images.

35. The system of claim 4, wherein the output interface is further configured to output the real time images on the same output interface module as used for outputting the reference images.

36. The system of claim 35, wherein the real time images and reference images are outputted in an arrangement which facilitates at least one of: analysis, overseeing, training, development, or input.

37. The system of claim 36, wherein at least one of first reference image and the new reference image is outputted as a picture within a larger picture of one or more of the real time images.

38. The system of claim 4, wherein the output interface is further configured to process at least one of the first reference image and the new reference image or the real time images.

39. The system of claim 1, wherein viewing of at least one of the first reference image and the new reference image by the operator enables at least one of the following: analysis, overseeing, training, system development, or input.

40. The system of claim 1, wherein other information is provided for output to the operator by at least one of the tracker or an image source.

* * * * *